United States Patent [19]

Poetter

[11] Patent Number: 4,469,594
[45] Date of Patent: Sep. 4, 1984

[54] HIGH PRESSURE HYDRAULIC SYSTEM AND SELF-CLEANING FILTER ASSEMBLY THEREFOR

[75] Inventor: Rainer Poetter, Calw, Fed. Rep. of Germany

[73] Assignee: Harnischfeger Corporation, Milwaukee, Wis.

[21] Appl. No.: 440,981

[22] Filed: Nov. 12, 1982

[51] Int. Cl.³ .................... B01D 35/02; B01D 35/22
[52] U.S. Cl. .................... 210/108; 210/136; 210/168; 210/416.5; 414/694; 60/454
[58] Field of Search ............... 210/108, 133, 136, 196, 210/340, 411, 451, 484, 497.01, 168, 171, 416.5, 424, 423, 425, 130, 341, 167; 414/694; 137/599.1; 60/454

[56] References Cited
U.S. PATENT DOCUMENTS

| | | | |
|---|---|---|---|
| 844,438 | 2/1907 | Bayley | 210/424 |
| 4,027,595 | 6/1977 | Frank et al. | 60/454 |
| 4,322,290 | 3/1982 | Carl | 210/136 |

*Primary Examiner*—Richard V. Fisher
*Assistant Examiner*—Wanda L. Millard
*Attorney, Agent, or Firm*—James E. Nilles

[57] ABSTRACT

A hydraulically operated mining shovel comprises a stick which is pivotable in opposite directions by a pair of extendible/retractable double-acting hydraulic cylinders. A high-pressure hydraulic system is provided for operating and controlling the cylinders and comprises a fluid reservoir, a pump for supplying high-pressure hydraulic fluid, and a selector valve located between the pump and the cylinders and between the cylinders and the reservoir. A main filter, removable for cleaning, is located in a fluid return line leading to the reservoir. A self-cleaning filter assembly is connected in each fluid supply/return line connected between the selector valve and a hydraulic cylinder. Each filter assembly comprises a housing in which a pair of cone-shaped fine-mesh filters are connected in parallel with each other and in parallel with an adjustably one-way check valve. In operation, all of the pressurized fluid supplied from the selector valve through a filter assembly to its associated cylinder passes through the pair of filters, wherein any fluid contaminants are trapped, and none flows through the check valve. However, of the low-pressure back-flowing fluid returning from a cylinder through an associated filter assembly to the selector valve, the major portion (about 70 percent) passes through the one-way check valve, and the remainder passes through the pair of filters to prevent collapse of the filters and to back-flush any contaminants trapped therein back into the main filter for subsequent removal from the system.

12 Claims, 7 Drawing Figures

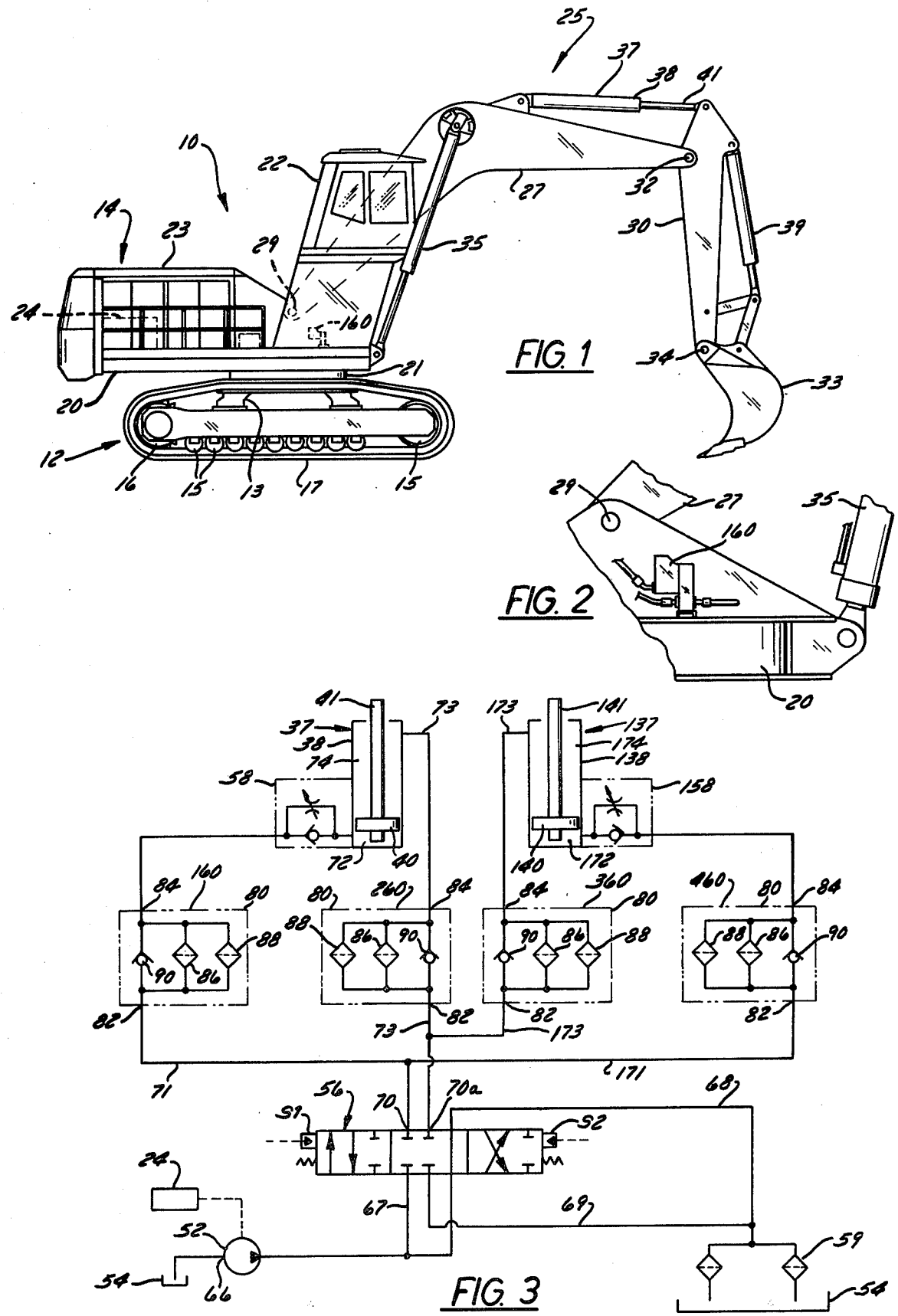

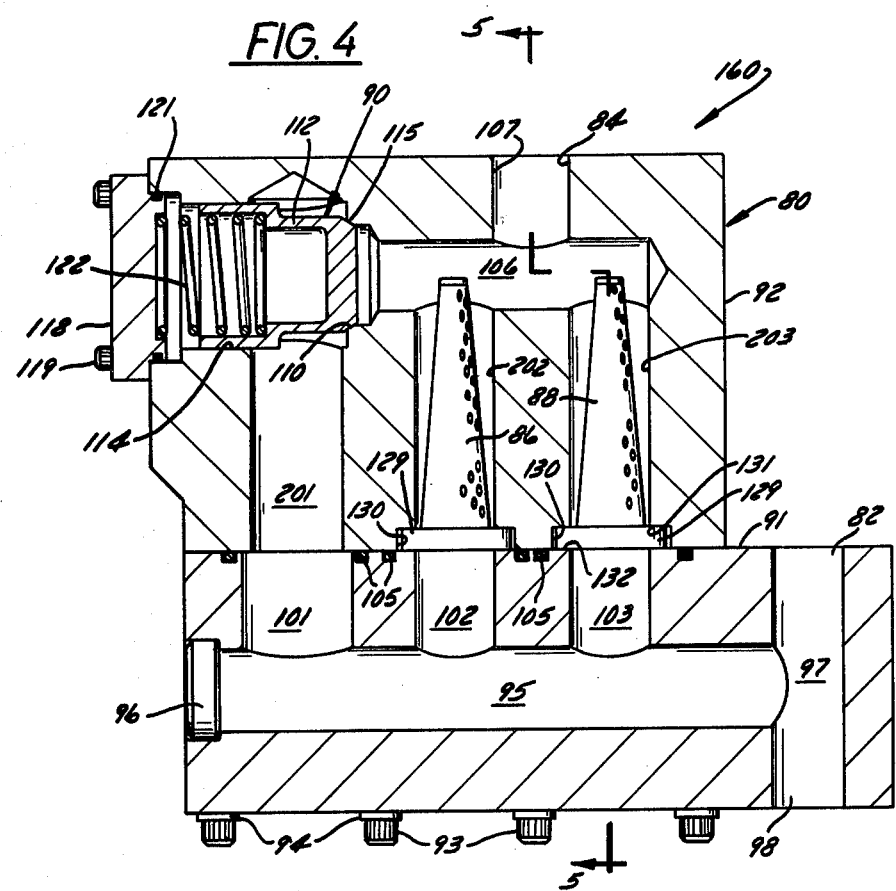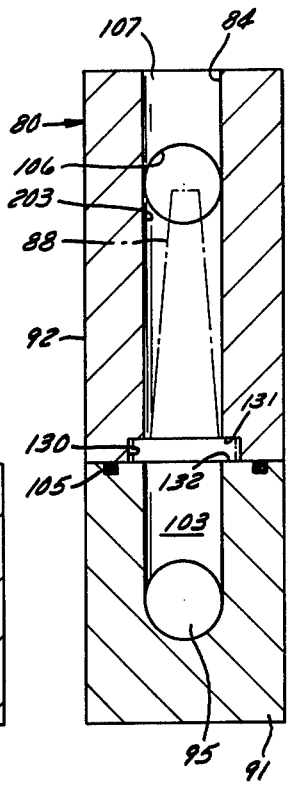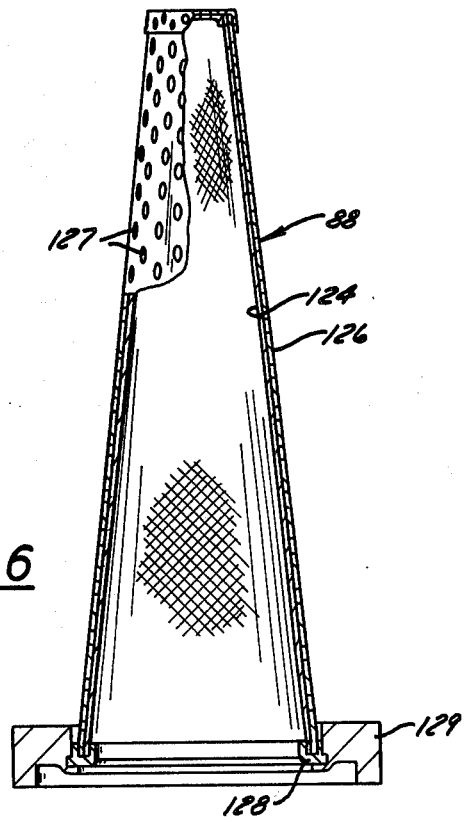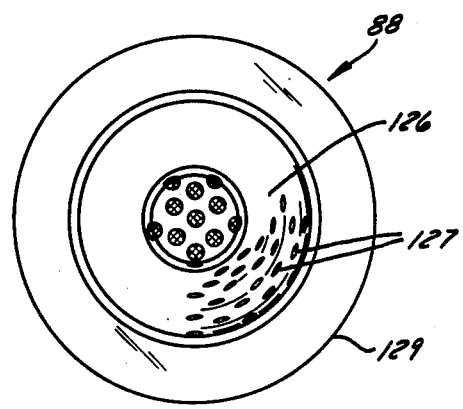

HIGH PRESSURE HYDRAULIC SYSTEM AND SELF-CLEANING FILTER ASSEMBLY THEREFOR

BACKGROUND OF THE INVENTION

1. Field of Use

This invention relates generally to a high-pressure hydraulic system and to a self-cleaning filter assembly therefor. In particular, it relates to a high-pressure hydraulic system such as is used, for example, in a large machine, such as a mining shovel or construction machinery or the like, to effect and control movement of large, heavy components in the machine.

2. Description of the Prior Art

Some large machines, such as mining shovels or construction or the like, employ various large, heavy, movable components which are movable or swingable in opposite directions by means of large hydraulic motors, such as extendible/retractable, double-acting, large hydraulic cylinders or rams. Such components may comprise, as in the case of a mining shovel for example, a boom, a stock and a shovel or scoop. Frequently, because of the size and weight of a single component, a pair of hydraulic cylinders mechanically and hydraulically connected in parallel with each other are employed to move that component. The hydraulic cylinders are operated and controlled by a high-pressure hydraulic control system in which they are incorporated and such a system typically comprises a hydraulic fluid reservoir, one or more high-pressure pumps (driven, for example, by the prime mover on the machine), various control valves and pressure relief valves, and filters to remove contaminants from the hydraulic fluid circulating through the system. Contaminants take the form of very small particles of metal and other materials, such as neoprene and teflon, from which the hydraulic cylinders are constructed and which wear away during operation of these components. Even though high-pressure hydraulic systems usually employ filters to filter out such contaminants, the prior art arrangement and location of such filters still enables some of these contaminants to be circulated through the hydraulic system from one system component to another wherein they can cause damage to or malfunction of that system component. In some cases, as where a pair of hydraulic cylinders are connected in parallel, catastrophic mechanical failure of one cylinder resulting from contaminants can sometimes result in failure of the parallel cylinder with resultant risks of human injury and other system damage, as well as expensive repairs. In some prior art high-pressure hydraulic systems, for example, a final filter is installed immediately upstream of a fluid system component to be protected, and this filter is downstream of the system's main filter which is usually near the fluid reservoir. Nevertheless, debris exchange may still take place upstream of the final filter. A further problem with some commercially available filters used in high-pressure systems is the tendency of the filter, either because it is clogged or because of its special configuration, to collapse when subjected to high-pressure fluid flow therethrough, thereby resulting in a non-effective filter or, in some cases, interference with proper fluid flow through the system. Therefore, in some cases an internal by-pass valve is provided which permits flow to reach critical components even if the filter becomes clogged with contaminants.

SUMMARY OF THE PRESENT INVENTION

In accordance with the present invention there is provided a high-pressure hydraulic system of the type used in a large machine, such as a mining shovel or the like, which employs self-cleaning filter assemblies of improved construction and arranged in an improved manner so as to effectively remove contaminants from the system and thereby protect system components. The invention is disclosed herein as embodied in a hydraulically operated machine having at least one movable machine component; at least one system component, such as a hydraulic motor in the form of a hydraulic cylinder, for moving the machine component; and a high-pressure hydraulic system for operating and controlling the hydraulic motor. The hydraulic system comprises a fluid reservoir; a pump for supplying fluid from the reservoir to operate the motor; a selector valve for directing fluid from the pump to the motor and from the motor to the reservoir; a removable main filter connected between the selector valve and the reservoir; and at least one self-cleaning filter assembly connected between the selector valve and the motor. The filter assembly comprises at least one filter and a one-way check valve connected in parallel with the filter. The filter is, for example, of a type which can handle high-pressure fluid flowing in one direction therethrough but which would collapse if subjected to high-pressure fluid flow in the opposite direction.

The filter assembly operates so that when fluid moves from the selector valve toward the motor, all of the fluid passes through the filter wherein contaminants are trapped. However, when fluid moves in an opposite direction, most of the fluid (about 70 percent) passes through the one-way check valve and the remainder (about 30 percent) passes through the filter to backflush the filter and force flushed-out contaminants back to the removable main filter, and to prevent collapse of the filter. Preferably, a pair of filters arranged in parallel with each other are used in a filter assembly, but a greater number could be employed.

The filter assembly is well adapted for use in hydraulic systems wherein a pair of motors, such as hydraulic cylinders, are arranged in parallel but need to be hydraulically isolated from one another so that failure of one resulting from contaminants will not effect failure to the other.

In a preferred embodiment, the filter assembly comprises a housing having a pair of fluid ports and three bored passages arranged in parallel with each other between the pair of fluid ports. Two of the passages contain conical fine-mesh filters and the third passage contains a one-way spring-biased check valve. The check valve is normally biased to closed position wherein it prevents fluid flow in one direction through the third passage but permits fluid flow in the opposite direction when fluid pressure exceeds a predetermined value. The check valve is adjustable to enable it to open at any one of several pressure levels. The filter assembly is operable so that when fluid moves in one direction between the fluid ports, substantially all of the fluid passes through the filters and none passes through the check valve. The filter assembly is further operable so that when fluid moves in the opposite direction between the fluid ports, most of the fluid (about 70 percent) passes through the third passage containing the check valve and the remainder of the fluid passes through the passages containing the filters so that each of the pair of filters handles about 15 percent of the total fluid flow. The filter assembly effects filtering of all fluid moving in one direction and enables fluid flowing in the opposite direction to effect back-flushing of the filters but without risk of causing collapse of the filters.

A hydraulic system embodying filter assemblies constructed and arranged in accordance with the invention offers numerous advantages over the prior art. For example, contaminants are trapped by the filter before they reach a system component such as a hydraulic motor or cylinder and are subsequently automatically back-flushed to a main filter in the hydraulic system which can be periodically removed and cleaned. The filter assemblies can be employed wherever needed in a hydraulic system and can be used to effectively isolate system components against contamination from one another. The filter assembly construction enables rapid back-flow of high-pressure hydraulic fluid from a system component during operation of the machine but prevents collapse or damage to the filters. The rate and pressure of the back-flow can be adjusted to suit special circumstances or to take into account filter size and shape. Other objects and advantages will hereinafter appear.

DESCRIPTION OF THE DRAWINGS

FIG. 1 is a side elevation view of a large mining shovel employing a high-pressure hydraulic system and self-cleaning filter assembly therefor in accordance with the present invention;

FIG. 2 is a greatly enlarged side elevation view of a filter assembly shown in FIG. 1;

FIG. 3 is a hydraulic circuit diagram of a portion of the hydraulic operating and control system for the machine of FIG. 1 and which shows hydraulic cylinders and self-cleaning filter assemblies in accordance with the present invention;

FIG. 4 is a greatly enlarged cross-section view of a filter assembly shown in FIGS. 1, 2 and 3;

FIG. 5 is a cross-section view taken on line 5—5 of FIG. 4;

FIG. 6 is a greatly enlarged view, partly in cross section, of one of the filters shown in FIG. 4; and FIG. 7 is a top plan view of the filter shown in FIG. 6.

DESCRIPTION OF A PREFERRED EMBODIMENT

Referring to FIG. 1, the numeral 10 designates a machine, such as a large mining shovel, having a lower section 12 on which an upper section 14 is mounted for rotation about a vertical axis. Lower section 12 comprises a chassis 13 having idler rollers 15 and a driven roller 16 and an endless flexible crawler track 17 is mounted on these rollers. As will be understood, FIG. 1 shows only one set of rollers 15, one roller 16, and one track 17, for one side of the machine 10, but one track is provided on each lateral side of machine 20. Upper section 14 comprises a supporting frame 20 which is rotatably mounted on lower section chassis 13 by means of a slewing ring assembly 21. Mounted on supporting frame 20 are a machinery housing 23, an operator's cab 22, and a shovel assembly 25. Machinery housing 23 encloses a prime mover 24, such as an internal combustion engine, and various hydraulic pumps and motors (only some of which are shown in FIG. 3) for propelling machine 10 and for operating certain movable machine components in machine 10. The shovel assembly 25 comprises certain movable components such as a boom 27 which is pivotably connected to frame 20 by a pivot pin 29, a stick 30 which is pivotable connected to boom 27 by a pivot pin 32, and a bucket 33 which is pivotably connected to stick 30 by a pin 34. The movable components 27, 30, 33 are moved or operated by hydraulic motors such as extendible/retractable double-acting hydraulic cylinders or rams 35, 37 and 137, 39 respectively. A pair of boom hoist cylinders 35 (only one shown in FIG. 1) are pivotably connected between boom 27 and frame 20. A pair of stick cylinders 37 and 137 (shown in FIG. 3 but only one shown in FIG. 1) are pivotably connected between boom 27 and stick 30. A pair of bucket cylinders 39 (only one shown in FIG. 1) are pivotably connected between bucket 33 and stick 30.

Cylinders 37 and 137 comprise housings 38 and 138, respectively, in which pistons 40 and 140, respectively, are slidably mounted. The pistons 40 and 140 have piston rods 41 and 141, respectively, connected thereto.

A high pressure hydraulic operating and control system is provided in machine 10 for the system components such as the hydraulic rams 35, 37 and 137, 39, as well as for other hydraulic motors (not shown) in machine 10. FIG. 3 is a hydraulic circuit diagram of that portion of the aforesaid hydraulic system which operates and controls the pair of stick cylinders 37 and 137. The said portion of the circuit includes a hydraulic pump 52 driven by engine 24; a fluid reservoir 54; a two-way three-position solenoid operated selector valve 56; a pair of holding valves 58 and 158 for the cylinders 37 and 137, respectively; a removable filter unit 59 upstream of reservoir 54; and a plurality of (four) self-cleaning filter assemblies 160, 260, 360 and 460 constructed and arranged in accordance with the present invention.

It is to be understood that the four filter assemblies 160, 260, 360 and 460 are identical to each other in construction and mode of operation; and, therefore, only filter assembly 160 is hereinafter described in detail. FIGS. 1 and 2 show side elevation views of the filter assembly 160 and how and where it is located on machine 10. FIG. 3 shows schematic diagrams of each of the four filter assemblies 160 through 460. FIGS. 4 and 5 are cross-section views of filter assembly 160. FIGS. 6 and 7 are views of one filter 88 used in filter assembly 160.

As the hydraulic circuit diagram in FIG. 3 shows, the intake port of hydraulic pump 52 is connected by a fluid line 66 to reservoir 54. The pressure port of pump 52 is connected by a fluid line 67 to supply the valve 56 and by a fluid line 68 to return excess fluid to reservoir 54 when valve 56 is neutral, as shown in FIG. 3. Hydraulic pump 52 takes the form of a commercially available pump capable of delivering, for example, about 112 gallons per minute at a pressure of up to about 4,000 pounds per square inch.

Selector valve 56 takes the form of a commercially available four-way three-position spring-biased hydraulically pilot-operated control valve which has a neutral position (in which it is shown biased in FIG. 3), a stick-forward position, and a stick-back position. Selector valve 56 comprises pilots S1 and S2 which are selectively energizable to operate the valve, as by a pilot circuit (not shown). In neutral position, valve 56 prevents pump 52 from supplying pressurized fluid to the cylinders 37 and 137 and prevents return flow of fluid from the cylinders 37 and 137 to reservoir 54. Valve 56 has a first port 70 for supplying or returning pressurized fluid through supply lines 71 and 171. Lines 71 and 171 are connected to the lower (extend) chambers 72 and 172, respectively in the cylinders 37 and 137, respectively, through the holding valves 58 and 158, respectively. Valve 56 has a second port 70a for supplying or returning pressurized fluid through supply lines 73 and 173. Lines 73 and 173 are connected to the upper (retract) chambers 74 and 174, respectively, in the cylinders 37 and 137, respectively.

The filter assemblies 160, 260, 360 and 460 are located in the fluid lines 71, 73, 173 and 171, respectively. As FIG. 3 shows, each filter assembly 260, 360 and 460 is constructed in the same manner as filter assembly 160 and comprises a housing 80 having first and second fluid ports 82 and 84, respectively, and in which a pair of cone-shaped, fine-mesh filters 86 and 88 are connected in parallel with each other and in parallel with a one-way check valve 90 between the ports 82 and 84. In operation, all of the fluid supplied through filter assembly 160 from port 82 to port 84 and thence to extended chamber 72 of its associated cylinder 37 passes through the two filters 86 and 88, wherein any fluid contaminants are trapped, and none flows through the check valve 90 because it is poled as shown in FIG. 3. However, of the fluid returning from chamber 72 of cylinder 37 from port 84 to port 82 of associated filter assembly 160, the major portion (about 70 percent) passes through the one-way check valve 90, and the remainder (about 30 percent) passes through each of the two filters 86 and 88 to back-flush any contaminants trapped therein back through the fluid lines and into the main filter unit 59 for subsequent removal from the system.

As FIGS. 4 and 5 show, in a preferred embodiment of filter assembly 160, housing 80 comprises a manifold 91 to which a filter and valve block 92 is rigidly secured as by a plurality of cap screws 93 which are provided with lock washers 94. Manifold 91 comprises an end-bored internal passage 95 closed at one end by an end cap 96 and connected at its other end to a cross-bored passage 97, one end of which serves as first port 82 hereinbefore referred to and the other end of which serves as a crossover port 98 by which it is connectable to other filter assemblies, as shown in FIG. 3. Manifold 91 further comprises three cross-bored passages 101, 102 and 103 which connect to passage 95 and which register with three cross-bored passages 201, 202 and 203, respectively, in filter and valve block 92. O-rings such as 105 are provided for sealing purposes between manifold 91 and block 92 around the inner end of each passage 101, 102 and 103. Block 92 comprises an end-bored internal passage 106 with which the cross-bored passages 201, 202 and 203 communicate. Internal passage 106 is also connected to a cross-bored passage 107, the outer end of which serves as second port 84 hereinbefore referred to. Thus, three passages are connected in parallel with each other between the fluid ports 82 and 84 in housing 80, namely 101-201; 102-202; and 103-203.

As FIG. 4 shows, check valve 90 is mounted within the end of passage 106 and extends through passage 201 to control fluid flow between the passages 106 and 201. Passage 106 is enlarged as at 114 in the region between the side of bore 201 and the outside of block 92 to accommodate check valve 90. Passage 106 is provided with a conical surface which serves as a valve seat 110. Check valve 90 comprises a generally cylindrical valve poppet 112, hollow but closed at one end, which is provided with a conical surface 115 at its closed end which is engageable with valve seat 110. The outer end of passage 106 is closed by a cover plate 118 which is rigidly secured to block 92 by cap screws 119. An O-ring 121 is provided for the cover plate 118 to prevent fluid leakage therepast. Check valve 90 comprises helical compression spring 122 which is disposed between valve poppet 112 and cover plate 118 to bias the conical surface 115 of the valve poppet against the valve seat 110 to prevent fluid flow from passage 201 to passage 106. However, spring 122 allows valve poppet 112 to shift axially to an open position wherein fluid flow from passage 106 to passage 201 is possible. The pressure level needed to effect opening or unseating the valve poppet 112 is determined by the size (i.e., the force) of the spring 122 and can be adjusted by providing springs of different sizes or by shimming the spring by suitable means (not shown).

As FIGS. 4 and 5 show, the filters 86 and 88 are mounted within the passages 202 and 203, respectively, in block 92. Thus, the filters are in parallel with each other and in parallel with check valve 90. Since the filters 86 and 88 are identical, only filter 88, also shown in FIGS. 6 and 7, is hereinafter described in detail. Filter 88 comprises a hollow conically shaped inner filter element portion 124 which is formed of finely woven stainless steel wire mesh having openings or a mesh size of a nominal 160 microns, a hollow conically shaped outer protective portion 126 which is formed of stainless steel having perforations 127 therethrough, a grooved annular connector ring 128 for mechanically securing together the lower ends of the portions 124 and 127, and an annular adapter ring 129 mechanically secured to the connector ring 128 to facilitate mounting of the filter 88 in an installation. As FIGS. 4 and 5 show, adapter ring 129 for filter 88 is entrapped in an annular groove 130 formed at the lower end of passage 203, between a shoulder 131 formed by groove 130 and the confronting surface 132 of manifold 91. Filter 88 may take the form of a type of commercially available filter described in detail in a brochure designated "Field Service Report No. 100" and entitled *"LCF" Last Chance Filtration, Its Application In Fluid Systems* by Robert Mason and published by Mectron Industries, Inc., a subsidiary of PALL Corporation, 9857 Remer Street, South El Monte, Calif. 91733.

In an actual embodiment of the invention, filter 88 was about 140 millimeters long, had a burst pressure of about 1000 psid (differential pressure) for forward fluid flow and had a collapse pressure of about 100 psid (differential pressure) for reverse fluid flow.

Operation

The mining shovel 10 shown in FIG. 1 and the hydraulic system therefor shown in FIG. 3 operate as follows. Assume that engine 24 is in operation and is driving pump 52 but that control valve 56 is in the neutral position shown in FIG. 3. In this circumstance pressurized fluid from pump 52 flows through valve 56 and line 68 through the main filter 59 back to reservoir 54 which supplies hydraulic fluid to pump 52. Further assume that the hydraulic cylinders 37 and 137 are in the retracted (stick-back) position shown in FIG. 3 and that it is desired to extend the piston rods 41 and 141 of the cylinders 37 and 137, respectively, to effect appropriate movement of stick 30 of machine 10.

Extension of cylinders 37 and 137 is accomplished by shifting selector valve 56 to the extend position by actuation of the pilot piston S1 shown in FIG. 3. When selector valve 56 is in the extend position, pump 52 supplies high-pressure fluid through line 67, through valve 56, through port 70, through lines 71 and 171, through filter assemblies 160 and 460, through the holding valves 58 and 158, to the extend chambers 72 and 172 of the cylinders 37 and 137, respectively. In each of the filter assemblies 160 and 460, fluid flows from port 82 to port 84, and as a result valve 90 remains closed and all fluid passing through the filter assembly passes through the filters 86 and 88 causing any contaminants in the fluid to be entrapped on the filters. As FIGS. 5 and 6 make clear, fluid flow in the direction just described would be from the inside of the cone-shaped filter 88 to the outside thereof. As is apparent from FIG. 6, fluid differential pressure even as high as 1,000 psid would not cause deformation or damage to filter element 124 because fluid flow would tend to press the filter element 124 outwardly against the inside surface of the rigid cone-shaped member 126. When the cylinders 37 and 137 are extended to whatever extent desired, selector valve 56 is returned to the neutral position shown in FIG. 3 and the pistons 40 and 140 of the cylinders 37 and 137, respectively, remain in the position in which they are moved due to the action of the holding valves 58 and 158, respectively.

During the above-described extending movement of the cylinders 37 and 137, the movement of the pistons 40 and 140 causes hydraulic fluid to be expelled at low pressure from the chambers 74 and 174 of the cylinders 37 and 137, respectively. Such fluid flows through the lines 73 and 173, through the filter assemblies 260 and 360, through the port 70a of valve 56 and through fluid return line 69 and through the main filter unit 59 to the reservoir 54. As FIG. 2 makes clear, fluid flow through each of the filter assemblies 260 and 360 is from port 84 to port 82. Because of the direction in which the valves 90 are poled in the filter assemblies 260 and 360, and because of the degree or extent to which the valves 90 are permitted to open by virtue of how they have been adjusted, most of the fluid flowing from port 84 to port 82 in each filter assembly 260 and 360 flows through the valve 90 and the balance of the fluid flows in a back-flow direction through the filters 86 and 88. In practice it is preferred that in each of the filter assemblies 160–460 about 70 percent of the fluid flow from port 84 to port 82 is through valve 90 and the balance is divided equally through the filters 86 and 88 so that each filter 86 and 88 handles about 15 percent of the total fluid flow through the filter assembly. As FIG. 6 makes clear, back-flow of high-pressure fluid through a filter, such as filter 88, is through the holes 127 in the outside conical member 126 and then through the screen 124 located within member 126. This back-flow is sufficient to back-flush most entrapped contaminants from screen 124 back through valve 56 to main filter unit 59. Since fluid pressure in each fluid line 73 and 173 is, for example, on the order of 5,000 psi and since the screen 124 would tend to collapse inward if subjected to a fluid pressure even as low as one-tenth of the high pressure (i.e., a back pressure in the order of 1,000 psi), the valve 90 in the associate filter assembly must be adjusted to open easily enough so that the pressure of the fluid back-flow through the screen 124 does not exceed the screen-collapse pressure, for example.

As will be understood, valve 56 may be operated to effect retraction of the piston rods 41 and 141 in the hydraulic cylinders 37 and 137, respectively. During such operation fluid flow through the filter assemblies 260 and 360 is in the extend direction and fluid flow through the filter assemblies 160 and 460 is in the retract direction. Each filter assembly 160–460 would operate in a manner similar to that hereinbefore described.

In the hydraulic circuit arrangement shown in FIG. 3 each of the filter assemblies 160–460 is located directly upstream of the system component (hydraulic cylinder) which it is intended to protect against contamination. The filter assemblies are also in circuit through the lines 71, 73, 173 and 171 with the removable main filter unit 59 which is located just upstream of reservoir 54. Therefore, any contaminants back-flushed from the filter assemblies 160, 260, 360, 460 are directed into the main filter unit 59 which is periodically removed and cleaned. Since each line supplying fluid to hydraulic cylinders 37 or 137 is provided with a filter assembly, contaminants which are back-flushed from one filter assembly cannot get past another filter assembly even if they escape entrapment by main filter unit 59.

In the embodiment of the invention disclosed herein the filter assemblies 160 through 460 are shown as being employed in connection with the hydraulic cylinders 37 and 137 which operate a single component, namely, the stick 30 in machine 10. It is to be understood, however, that in machine 10 the other hydraulic cylinders 35 and 39 and other motors (not shown) would be provided with filter assemblies such as hereinbefore described.

I claim:

1. In a hydraulic system, in combination: a system component; a filter assembly connected to said component; and means for supplying hydraulic fluid through said filter assembly in a direction either toward or away from said system component; said filter assembly comprising; at least one filter; and a one-way check valve responsive to fluid flow and having open and closed positions and connected in parallel with said filter; said filter assembly being operable so that when fluid moves in a direction toward said system component, said check valve closes and substantially all of the fluid passes through said filter; and so that when fluid moves in a direction away from said system component, said check valve opens and most of the fluid passes through said check valve and the remainder passes through said filter.

2. A system according to claim 1 wherein said filter assembly comprises a pair of filters connected in parallel with each other.

3. A system according to claim 1 wherein said system component is a reversible hydraulic motor.

4. A system according to claim 3 wherein said means comprises a selectively operable control valve.

5. In a hydraulically operated machine, in combination:

a movable component;

a hydraulic motor for moving said component; and a hydraulic operating and control system comprising:

a fluid reservoir;

a pump for supplying fluid from said reservoir to operate said motor;

a selector valve for directing fluid between said pump and said motor or between said motor and said reservoir;

a main filter connected between said selector valve and said reservoir; and a self-cleaning filter assembly connected between said selector valve and said motor;

said filter assembly comprising:

at least one filter; and a one-way check valve connected in parallel with said filter;

said filter assembly being operable so that when fluid moves from said selector or valve toward said cylinder, all of the fluid passes through said filter; and when fluid moves in an opposite direction, most of the fluid passes through said check valve and the remainder passes through said filter.

6. A machine according to claim 5 wherein said filter assembly comprises a pair of filters connected in parallel with each other.

7. A machine according to claim 5 or 6 wherein said motor is an extendible/retractable hydraulic cylinder.

8. In a hydraulically operated machine, in combination:
a movable component;
a pair of hydraulic cylinders for moving said component; and
a hydraulic operating and control system comprising:
a fluid reservoir;
a pump for supplying fluid from said reservoir to operate said cylinders;
a selector valve for directing fluid between said pump and said cylinders and between said cylinders and said reservoir;
a main filter connected between said selector valve and said reservoir; and
a plurality of self-cleaning filter assemblies;
each self-cleaning filter assembly being connected between said selector valve and one of said cylinders;
each filter assembly comprising:
a pair of filters connected in parallel with each other; and a one-way check valve connected in parallel with said pair of filters;

each filter assembly being operable so that when fluid moves from said selector valve toward an associated cylinder, all of the fluid through the filter assembly passes through said pair of filters; and when fluid moves in an opposite direction, most of the fluid passes through said check valve and the remainder passes through at least one of said filters.

9. A filter assembly for a high pressure hydraulic system comprising: at least one filter; and a one-way check valve responsive to fluid flow and having open and closed positions and connected in parallel with said filter; said assembly being operable so that when fluid moves in one direction relative to said filter and said valve, said check valve closes and substantially all of the fluid passes through said filter; and when fluid moves in an opposite direction relative to said filter and said valve, said check valve opens and most of the fluid passes through said check valve and the remainder passes through said filter.

10. A filter assembly according to claim 9 including a pair of filters connected in parallel with each other and in parallel with said one-way check valve.

11. A filter assembly according to claim 10 including a housing having a pair of ports and passages in said housing between said ports and in which said filters and said one-way valve are located.

12. A filter assembly according to claim 9 wherein said filter is constructed so that it is able to withstand, without collapse, high fluid pressure when fluid moves therethrough in said one direction while said check valve is open rather than in said opposite direction and while said check valve is closed.

* * * * *